United States Patent
Hawksworth

(10) Patent No.: US 11,280,294 B2
(45) Date of Patent: Mar. 22, 2022

(54) COUPLING WITH ECCENTRIC BEARING ARRANGEMENT

(71) Applicant: Goodrich Actuation Systems Limited, Solihull (GB)

(72) Inventor: Andrew Hawksworth, Moreton (GB)

(73) Assignee: GOODRICH ACTUATION SYSTEMS LIMITED, Solihull (GB)

(*) Notice: Subject to any disclaimer, the term of this patent is extended or adjusted under 35 U.S.C. 154(b) by 37 days.

(21) Appl. No.: 16/221,782

(22) Filed: Dec. 17, 2018

(65) Prior Publication Data

US 2019/0271282 A1 Sep. 5, 2019

(30) Foreign Application Priority Data

Mar. 1, 2018 (EP) .................... 18275032

(51) Int. Cl.
*F02K 1/76* (2006.01)
*F02K 1/70* (2006.01)
*F16C 23/10* (2006.01)
*F16H 25/20* (2006.01)
*F16H 25/24* (2006.01)

(52) U.S. Cl.
CPC ............ *F02K 1/763* (2013.01); *F02K 1/70* (2013.01); *F16C 23/10* (2013.01); *F16H 25/2056* (2013.01); *F16C 2322/39* (2013.01); *F16H 2025/2436* (2013.01); *F16H 2025/2445* (2013.01)

(58) Field of Classification Search
CPC ..... F02K 1/70; F02K 1/72; F02K 1/62; F02K 1/625; F02K 1/763; F02K 1/80; F05D 2260/56; F05D 2260/30; F05D 2240/90; F02C 7/20; F16H 25/20; F16H 25/2018; F16H 25/2056; F16H 25/2204; F16H 25/2247; F16H 25/2285

See application file for complete search history.

(56) References Cited

U.S. PATENT DOCUMENTS

| | | | |
|---|---|---|---|
| 5,937,636 A | 8/1999 | Gonidec et al. | |
| 8,002,217 B2 | 8/2011 | Sternberger | |
| 2008/0210733 A1* | 9/2008 | Kerschbaumer | D21F 1/40 226/194 |
| 2011/0072780 A1* | 3/2011 | Somerfield | F16H 25/2204 60/226.2 |

FOREIGN PATENT DOCUMENTS

| | | |
|---|---|---|
| DE | 102005044956 A1 | 3/2007 |
| DE | 102006040777 A1 | 3/2008 |
| EP | 3228853 A1 | 10/2017 |
| EP | 3282132 A1 | 2/2018 |
| GB | 2449281 * | 11/2008 ............... F02K 1/15 |

OTHER PUBLICATIONS

Extended European Search Report for International Application No. 18275032.3 dated Aug. 31, 2018, 8 pages.

* cited by examiner

*Primary Examiner* — Andrew H Nguyen
(74) *Attorney, Agent, or Firm* — Cantor Colburn LLP

(57) ABSTRACT

A coupling e.g. for an actuator, includes a housing which is preferably in the form of a ring mounted around the end of an outer rod of the actuator and which can be mounted to a component e.g. a cowl being deployed. Within the housing of the coupling is provided an eccentric bearing mount and bearing arrangement mounted eccentrically to the housing so as to permit some eccentric movement.

3 Claims, 6 Drawing Sheets

COUPLING WITH ECCENTRIC BEARING ARRANGEMENT

FOREIGN PRIORITY

This application claims priority to European Patent Application No. 18275032.3 filed Mar. 1, 2018, the entire contents of which is incorporated herein by reference.

TECHNICAL BACKGROUND

The present disclosure relates to a coupling, particularly an eccentric coupling, for example, for an actuator assembly, such as a thrust reverser actuation system (TRAS).

BACKGROUND

Many mechanical systems require a coupling component or structure for coupling two or more parts of an assembly and to allow or prevent various degrees of movement between coupled parts.

Coupling structures are known, for example, for joining components of an actuator assembly. Depending on the operation and structure of the actuator assembly, couplings or joints may be designed to accommodate some translation of movement between the two components joined by the coupling, so as to avoid 'force fighting' or damage to one or both components due to the force on one of the components.

Some actuator assemblies (as discussed below) require three or more fixing points to accommodate relatively moveable parts of the actuator.

EP 3282132 teaches an eccentric coupling that allows some freedom of movement. This arrangement, however, may create undesirable friction.

The coupling of this disclosure will be specifically described in relation to an actuator such as commonly used in aircraft e.g. for deploying/moving cowls and flaps, more specifically, a TRAS. The coupling may, however, find a very wide range of applications and is not limited to this specific field. There is a general need for an eccentric coupling that permits some movement of a first component when a force is applied to a second component coupled to the first.

BRIEF DESCRIPTION

In one aspect, there is provided a coupling assembly comprising a housing configured to be fixedly attached to a fixed component, an inner bearing mount arranged to be mounted eccentrically around a first moveable component via first bearings, an outer bearing mount mounted eccentrically around the inner bearing mount via second bearings, such that the inner and outer bearing mounts rotate eccentrically relative to the housing in response to a force exerted on the first moveable component.

In another aspect, there is provided an assembly comprising a first moveable component and a second moveable component, moveable relative to the first, and a coupling as defined above.

The assembly is preferably an actuator wherein the first and second moveable components are components arranged to actuate, respectively, first and second moveable parts.

In one example, the first and second moveable components comprise telescopically arranged components such as a first and second (or outer and inner) rod.

The actuator may be an actuator for use in a TRAS system or other aircraft system where the two moveable components actuate two different system parts such as cowls, flaps, doors or the like.

The coupling housing is preferably in the form of a ring and the inner and outer bearing mounts are in the form of rings or annular disks mounted within the housing for eccentric movement within the housing.

Preferred embodiments will now be described by way of example only and with reference to the drawings.

DETAILED DESCRIPTION

The coupling of the disclosure will now be described with reference to the drawings, by way of example only, in the specific context of an actuator. Many mechanical systems comprise moveable parts driven by actuators. As an example, in aircraft, actuators drive moveable parts such as doors, flaps or cowls. One example of the use of such actuators is in a TRAS where actuators are used to deploy flaps or cowls to decelerate an aircraft. When not in use, the actuators are used to withdraw or stow the flaps/cowls. Actuators may be hydraulic or pneumatic, or, increasingly, electric (or a combination of types).

In traditional TRAS, flaps are driven by movement of a piston or rod of the actuator moving axially relative to a cylindrical housing. One end of the housing is attached to a fixed structure e.g. via a gimbal and the other end is open. The rod extends out of the open end of the cylinder and has an end e.g. an eye end that is attached to the movable cowl in a manner in which universal angular movement can be accommodated. To open the flap, the rod is driven axially out from the cylinder. To stow the cowl, the rod is retracted into the cylinder.

Conventionally, a TRAS has an actuator to operate the thrust reverser doors and the blocker doors are operated from a linkage mechanism from the thrust reverser doors, or by some other separate mechanism. The use of separate actuators for each door or cowl adds to the weight, space requirements, risk of faults and maintenance requirements in an aircraft.

Figure 1:
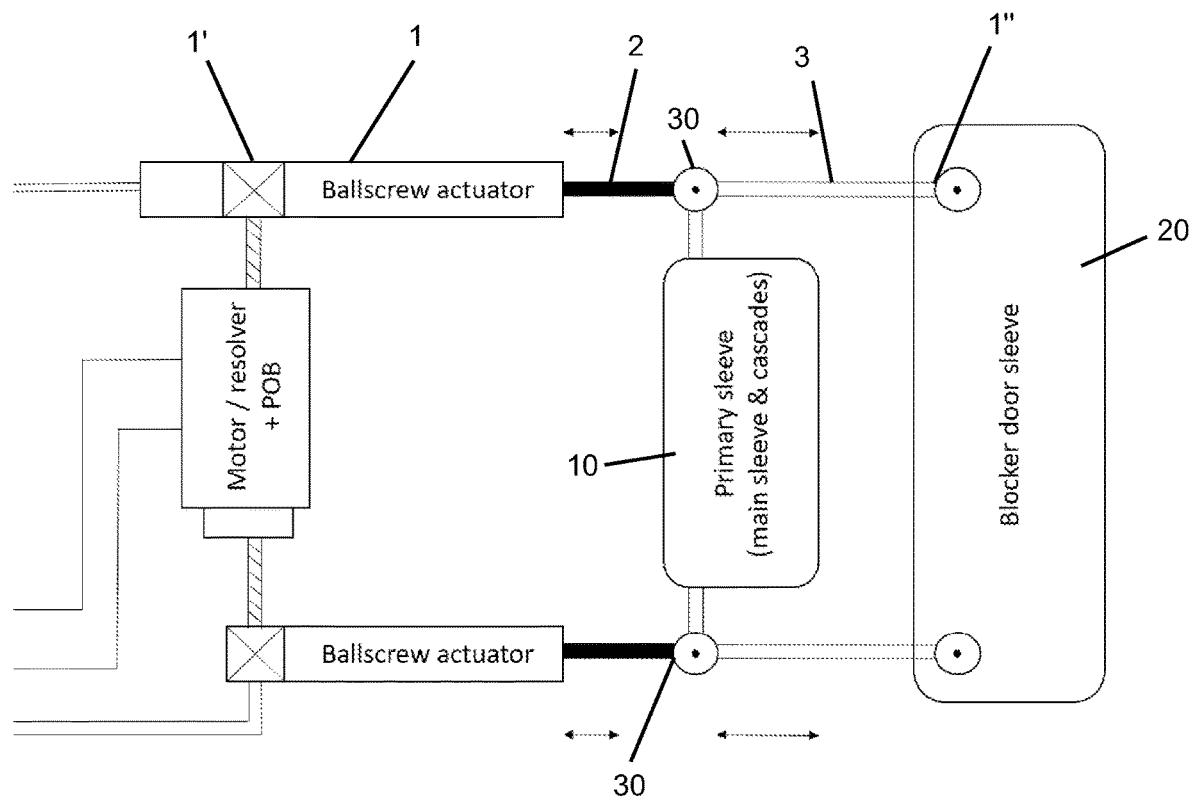
FIG. 1 is a schematic view of an actuator, in use, requiring three fixation points.
Figure 2:
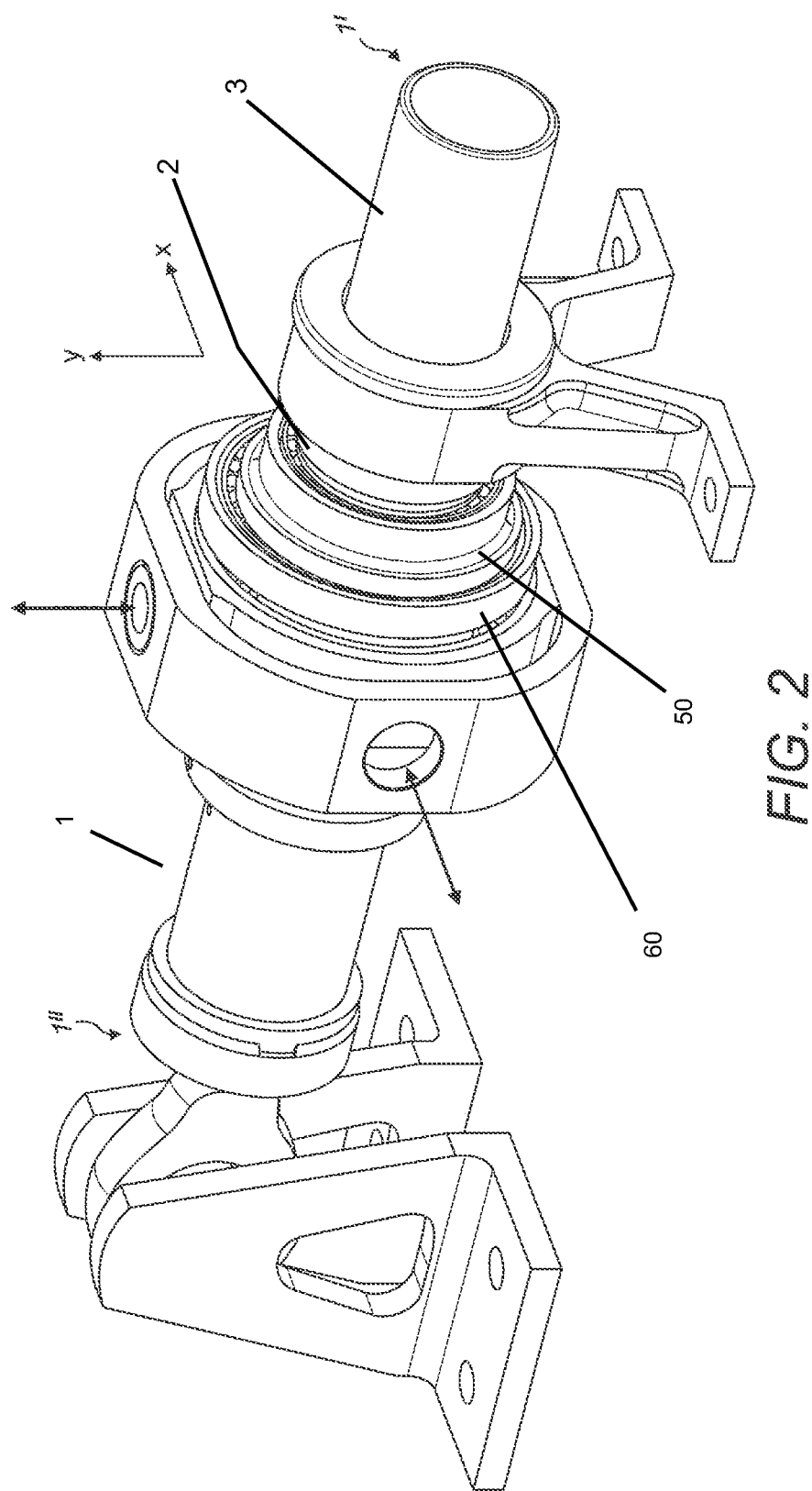
FIG. 2 is a perspective view of an eccentric coupling in accordance with the disclosure (mounted onto a rod just to show the coupling).

Referring to FIG. 1, an actuator has been developed comprising a dual rod assembly wherein, within the cylindrical housing 1, are mounted two relatively moveable rods or pistons 2, 3, one inside the other. Such an assembly is able to deploy and/or stow two cowls e.g. the thrust reverser door 10 and the blocker door 20 using a single, relatively compact unit, as opposed to two separate mechanisms or actuators as in conventional systems.

In such a dual rod system, one end 1' of the housing 1 is attached to a fixed structure, e.g. via a bulk head attachment and the remote end 1" of the actuator is attached to a moveable part/cowl e.g. via an eye end (not shown). In between these two fixation points, though, is a third fixation point 30 for the free end of the second rod/piston. An example can be seen in the figures. The cylindrical housing 1 accommodates an outer rod 2 and an inner rod 3, both rods axially moveable relative to the housing and to each other. The end of the outer rod extending from the open end of the cylinder is fixed to a first moveable part/cowl, flap, door etc., 10, e.g. via a gimbal or bearing (not shown). The end of the inner rod 3 is fixed to a second moveable cowl/flap/door 20 e.g. via the eye end 5 mentioned above. Actuation of the outer rod will cause deployment of the first cowl 10; actuation of the inner rod will cause deployment of the second cowl 20.

Figure 6:
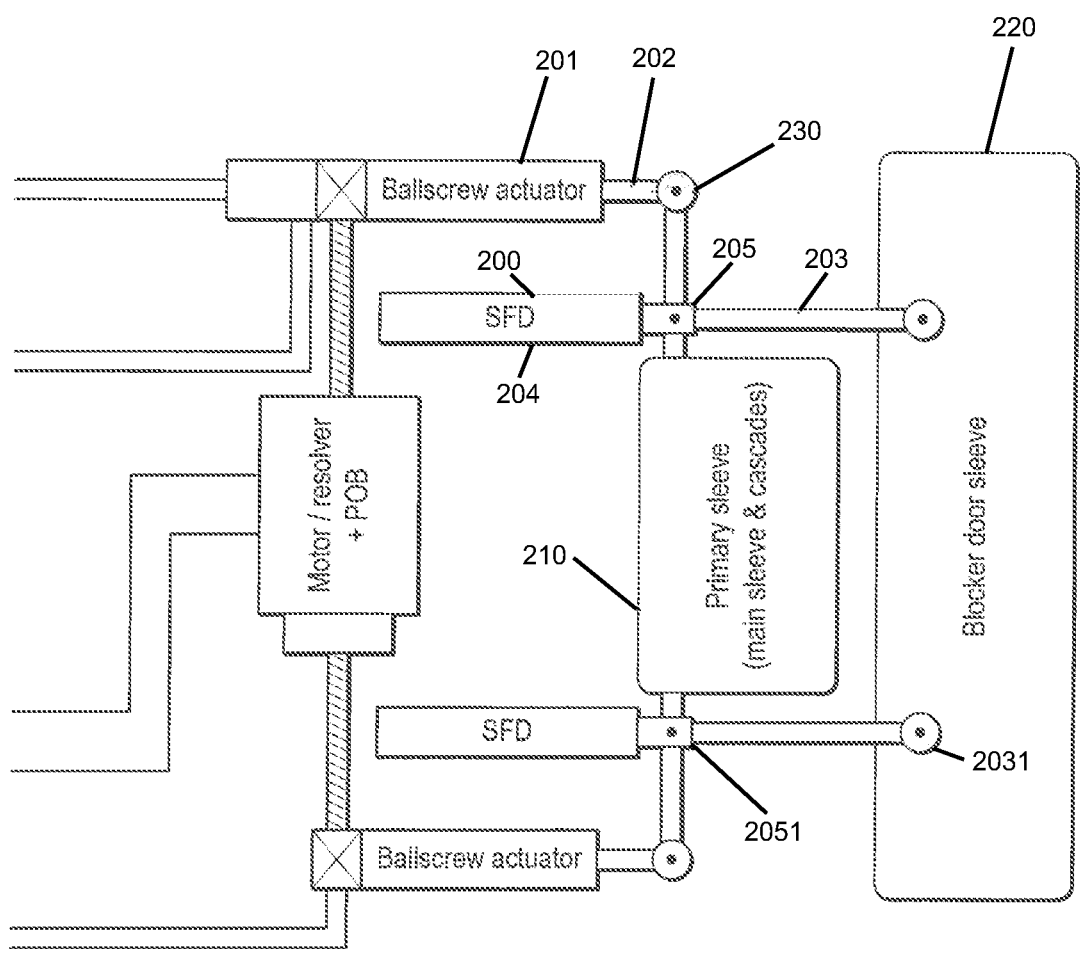
FIG. 6 is a schematic view of an alternative actuator assembly, in use.

FIG. 6 shows an alternative two-stroke actuator assembly. Conventional assemblies such as shown in FIG. 1 move the two parts (e.g. a blocker door and thrust reverser sleeve) by virtue of them being respectively connected to the inner and outer pistons of the ball screw actuator.

Recent improvements in actuator assemblies have been aimed at a reduced envelope for the actuator components and/or providing a variable driving force in each stage of actuation. Such assemblies incorporate a synchronized follower device, SFD, 200 between the ball screw actuator 201 and the components to be moved (e.g. blocker door sleeve 220 and primary sleeve 210). In such assemblies, the ball screw actuator 201 has one piston 202. The SFD comprises an outer housing 204 within which are axially moveably mounted an inner SFD piston 203 and an outer SFD piston 205. The free end 2031 of the inner SFD piston 203 is connected to the blocker door sleeve. The free end 2051 of the outer SFD piston 205 is connected to the primary sleeve and also to the ball screw actuator piston 202. In this embodiment, this is where the third fixation point 230, described above, is required and where the eccentric coupling would be mounted, as described above.

On deployment, briefly, the ball screw actuator piston 202 extends causing the outer SFD piston 205 to extend. The locking mechanism within the SFD (not described here, but as described in, e.g. EP 3228853) causes the inner SFD piston 203 to also extend for part of the actuator piston 202 stroke, causing movement of the blocker door. The inner SFD piston 203 locks relative to the outer SFD piston 205 during the stroke such that for the rest of the stroke, only the outer SFD piston 205, and hence the primary sleeve 210, move.

It can be seen that, compared to a conventional single stroke actuator with fixation points at the two ends, a dual stroke system requires an additional, third fixation point 30, 230 for the outer piston (of the actuator, in the simple embodiment, or of the SFD if provided). This third fixation point requires additional degrees of freedom to ensure that e.g. movement of the nacelle will not induce additional loads onto the actuator. In other words, angular movement of the fixation of the inner rod for deploying the second cowl should not be transferred to the fixation of the end of the outer rod with the first cowl and so the third fixation point needs to accommodate such angular movement.

The solution provided by the present disclosure is to provide an eccentric coupling 7 at the third fixation point such as to permit movement, e.g. planar movement, of the outer rod 2 relative to its fixation to the first cowl when angular movement of the inner rod 3 is transmitted.

A third coupling requires additional degrees of freedom to ensure, e.g. that nacelle structure movement will not induce side loads onto the actuator. This freedom of movement can be angular and planar. The third coupling must be designed to react to axial thrust loads generated from the actuator stroke and should not be restricted by friction.

The coupling 7 can be best seen with reference to FIGS. 3A to 3C and FIG. 5. In these figures, the coupling is mounted onto a fixed rod for demonstration purposes. In use, it would be mounted at the third fixation point 30, 230. In this example, the coupling comprises a housing 50, 60 which, here, is in the form of a ring mounted around the end of the outer rod 2 and which can be mounted to the component e.g. cowl being deployed by the outer rod by means of a coupling member such as a coupling bracket 9 which can, in turn, be mounted to the cowl either directly or, more preferably, via a steady bearing or a gimbal. Within the housing 50, 60 of the coupling 7 is an arrangement of bearings 100 that are housed eccentric to the axis between the bulk head attachment 4 and the rod end eye 5. The eccentric geometry allows uninhibited movement relative to the main axis, and the arrangement will accommodate positioned movement. The bearings 100 minimize the friction force during a planar displacement of the third fixation point.

Figure 3A:
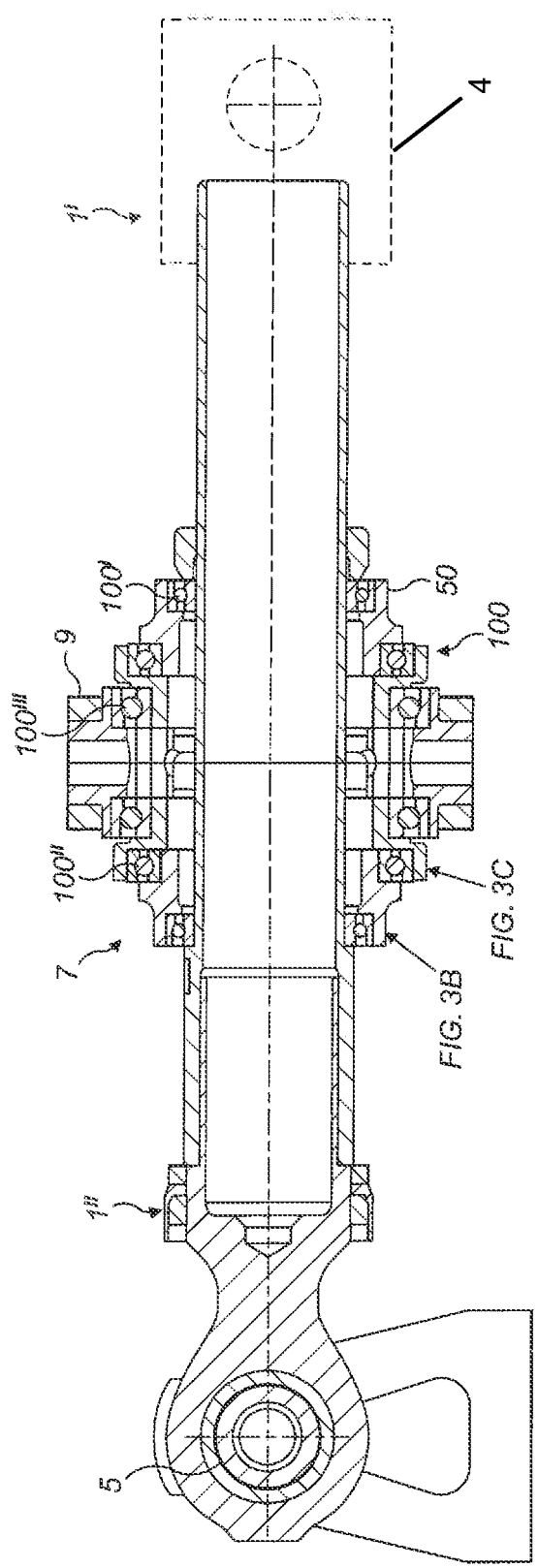
FIG. 3A is a sectional view of the eccentric coupling such as shown in FIG. 2.
Figure 3B:
FIGS. 3B and 3C are details of the housing components of the coupling from FIG. 3A showing the coupling in more detail.
Figure 3C:
Figure 4:
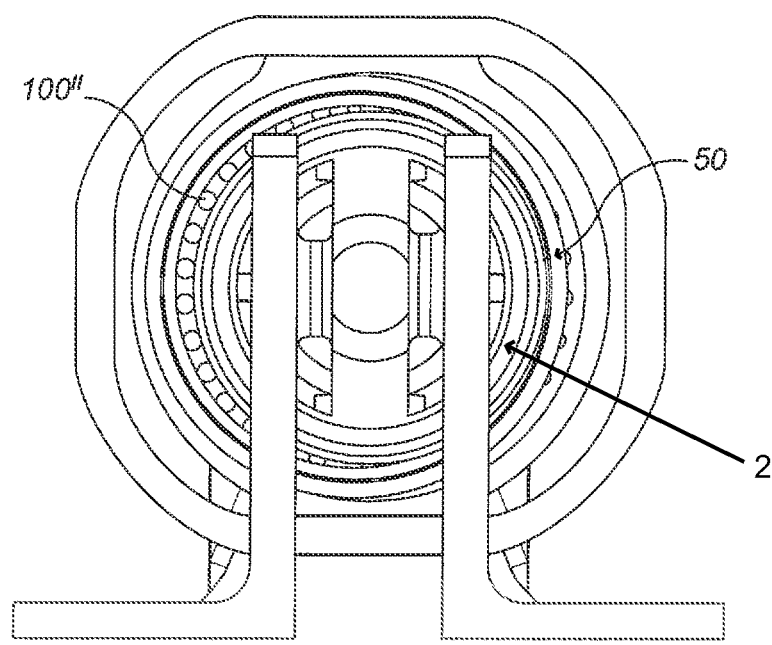
FIG. 4 is an end view through the eccentric coupling.
Figure 5:
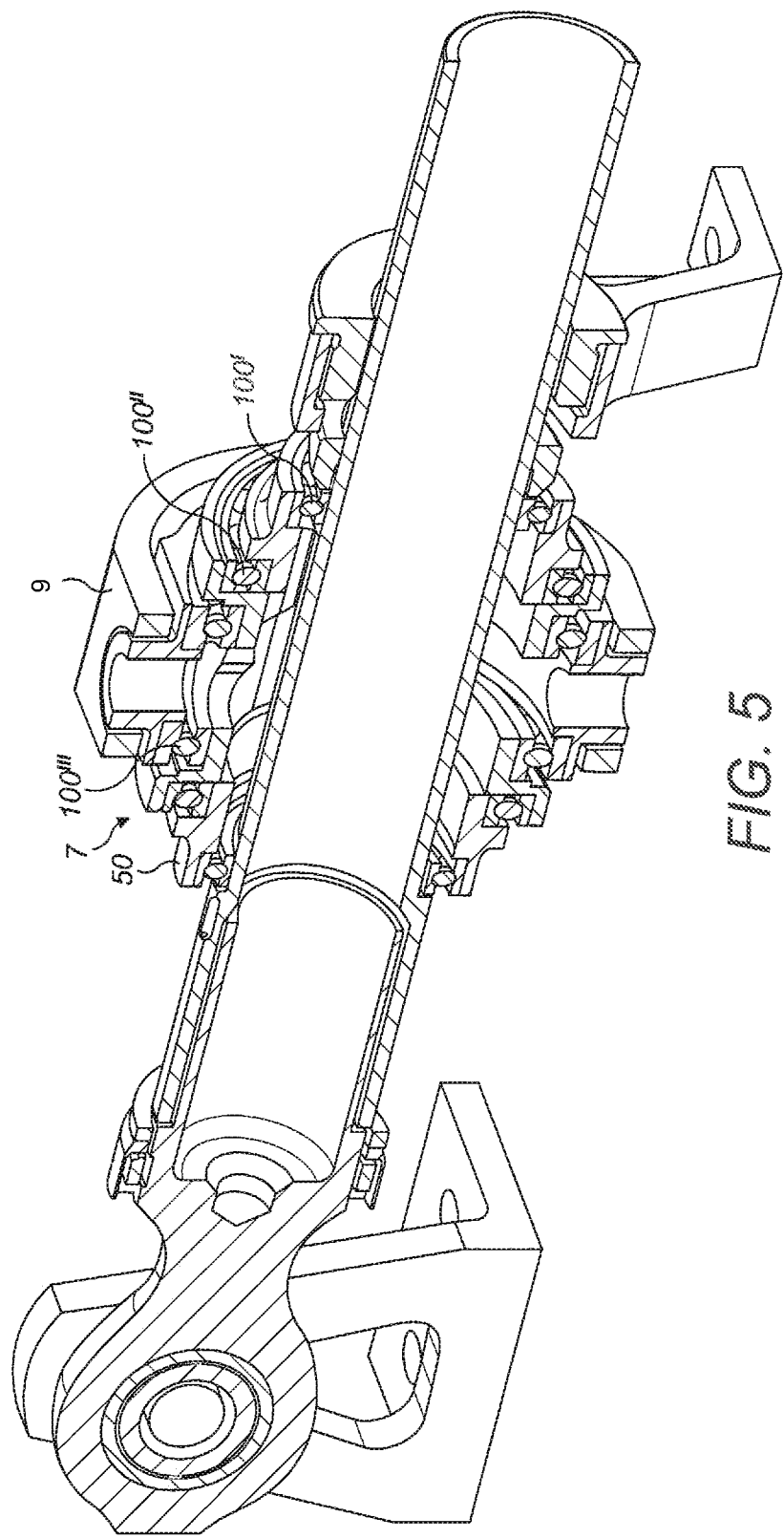
FIG. 5 is a perspective view corresponding to FIG. 3A.

The eccentric coupling 7 and bearing arrangement 100 will now be described in more detail, and can best be seen in FIGS. 3A, 4 and 5. The coupling housing comprises an inner bearing mount 50 in the form of a ring that is mounted eccentrically to the main axis, with ball bearings 100' located between the inner bearing mount 50 and the outer rod 2. The coupling housing further comprises an outer bearing mount 60 which is mounted eccentrically around the inner bearing mount 50 via ball bearings 100". The coupling 7 is mounted with the gimbal via bearings 100'''.

When a displacement of the gimbal is applied, the off-set (eccentric) nature of the bearing mounts provides freedom for the main tube axis to displace in a planar motion relative to the gimbal centre. During this planar movement the eccentric bearing mounts 50, 60 will rotate. This is caused by the offset moment which allows the bearing mounts to cam away.

In use, therefore, the outer rod 2 determines the position of the cowl or other component to which it is attached. The inner rod 3 is driven to control the position of another component, cowl etc. Movement of the inner rod will, however, create forces acting on the outer rod. The coupling will, due to the bearing arrangement, permit eccentric movement to allow for these forces without transmitting them to the cowl driven by the outer rod.

In the embodiment described and shown, the coupling has a circular ring outer shape. Other shapes are, of course, possible and these will, at least to some extent be determined by the shape and form of the actuator components. It is also feasible that the coupling may have more than two eccentrically mounted bearing mounts.

Such a coupling is advantageous for any actuators having three or more fixation points on a single axis.

The invention claimed is:

1. An actuator comprising:
   a dual rod assembly wherein, within a cylindrical housing are mounted a first rod and a second rod moveable relative to the first rod, wherein the first and the second rods are telescopically arranged one inside the other; and
   a coupling assembly;

an inner bearing mount arranged to be mounted eccentrically around and relative to the first rod via first bearings;

an outer bearing mount mounted eccentrically around and relative to the inner bearing mount via second bearings, such that the inner and the outer bearing mounts rotate eccentrically relative to the first rod in response to a force exerted on the first rod;

wherein the first and the second rods are arranged to actuate, respectively, first and second moveable parts.

2. The actuator of claim 1, wherein the coupling assembly has a coupling housing in the form of a ring and the inner and the outer bearing mounts are in the form of rings or annular discs mounted within the coupling housing for eccentric movement within the coupling housing.

3. The actuator of claim 1 for use in an aircraft TRAS system.

\* \* \* \* \*